(12) United States Patent
Maung et al.

(10) Patent No.: US 9,811,483 B2
(45) Date of Patent: Nov. 7, 2017

(54) CONFIGURABLE SERIAL COMMUNICATION HUB

(71) Applicant: TEXAS INSTRUMENTS INCORPORATED, Dallas, TX (US)

(72) Inventors: Win N. Maung, Plano, TX (US); Charles M. Campbell, Wylie, TX (US); Suzanne M. Vining, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/186,076

(22) Filed: Jun. 17, 2016

(65) Prior Publication Data

US 2016/0371206 A1  Dec. 22, 2016

Related U.S. Application Data

(60) Provisional application No. 62/182,177, filed on Jun. 19, 2015.

(51) Int. Cl.
*G06F 13/20* (2006.01)
*G06F 13/10* (2006.01)
*G06F 13/42* (2006.01)

(52) U.S. Cl.
CPC ............ *G06F 13/20* (2013.01); *G06F 13/102* (2013.01); *G06F 13/4282* (2013.01); *Y02B 60/1228* (2013.01); *Y02B 60/1235* (2013.01)

(58) Field of Classification Search
CPC .... G06F 13/20; G06F 13/102; G06F 13/4282; G06F 13/4004; G06F 13/4022
See application file for complete search history.

(56) References Cited

U.S. PATENT DOCUMENTS

| | | | |
|---|---|---|---|
| 6,108,702 A * | 8/2000 | Wood ...................... | H04L 41/12 370/254 |
| 2007/0266179 A1* | 11/2007 | Chavan ............... | G06F 13/4022 709/250 |
| 2015/0363339 A1* | 12/2015 | Huang ................... | G06F 13/10 710/33 |

\* cited by examiner

*Primary Examiner* — Farley Abad
(74) *Attorney, Agent, or Firm* — Goutham Kondapalli; Charles A. Brill; Frank D. Cimino

(57) ABSTRACT

An apparatus and method for configuring a serial communication hub are disclosed herein. A serial communication hub includes an upstream port, a plurality of downstream ports, and a port controller. The port controller is configured to: arrange each of a first of the downstream ports and a second of the downstream ports to individually operate as a first type of serial communication interface; and to arrange the first of the downstream ports and the second of the downstream ports to operate in combination as a second type of serial communication interface.

20 Claims, 4 Drawing Sheets

CONFIGURABLE SERIAL COMMUNICATION HUB

CROSS-REFERENCE TO RELATED APPLICATIONS

The present application claims priority to U.S. Provisional Patent Application No. 62/182,177 filed Jun. 19, 2015, titled "Type-A and Type-C Configurable Superspeed USB Device," which is hereby incorporated herein by reference in its entirety.

BACKGROUND

Computers and other electronic devices commonly use serial interfaces to provide for transfer of data between connected devices. The universal serial bus (USB) is one of a variety of serial buses used to interface electronic devices. A USB system generally consists of a host device and one or more peripheral devices connected in a tiered-star topology. Host devices include, for example, computers, smartphones, video game consoles, and other computing devices. Peripheral devices include, for example, flash drives, printers, keyboards, smartphones, cameras, tablets, and various other devices. USB operational standards are defined in a series of specifications (e.g., USB 2.0 specification, USB 3.0 specification, USB 3.1 specification, etc.)

SUMMARY

An apparatus and method for configuring a serial communication hub are disclosed herein. In one embodiment, a serial communication hub includes an upstream port, a plurality of downstream ports, and a port controller. The port controller is configured to: arrange each of a first of the downstream ports and a second of the downstream ports to individually operate as a first type of serial communication interface; and to arrange the first of the downstream ports and the second of the downstream ports to operate in combination as a second type of serial communication interface.

In another embodiment, a method for configuration of a serial communication hub includes: based on a configuration flag having a first value, arranging each of a first downstream port and a second downstream port to individually operate as a first type of serial communication interface; and based on the configuration flag having a second value, arranging the first downstream port and the second downstream ports to operate in combination as a second type of serial communication interface.

In a further embodiment, a serial bus expander includes a plurality of ports and a port controller. Each of the plurality of ports is configured to implement a first type of serial communication interface that comprises an irreversible electrical connector. Each of the ports includes first serial transmit and receive links, and second serial transmit and receive links. The port controller is configured to selectably arrange two of the ports to operate in combination to implement a second type of serial communication interface that comprises a reversible electrical connector; to apply the first serial transmit and receive links of only one of the ports in the second type of serial communication interface; and to identify the second type of serial communication interface by a same identification value without regard to which of the two ports provides the first serial transmit and receive links used in the second type of serial communication interface.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

As an increasing number of different types of devices are designed for communication via serial buses, such as a universal serial bus (USB), the features provided by the serial buses have also improved. For example, the bandwidth provided by USB variants has increased from 12/1.5 mega-bits per second (Mb/s) to 10 giga-bits per second (Gb/s) over time. Power delivery capabilities provided by the buses have similarly increased. Additionally, user friendliness of the buses has been improved by making the cable connectors reversible, so that the connectors can be inserted into receptacles in any orientation.

Hubs are bus expanders that multiply the number of ports available for connection of a device to the serial bus. For example, a hub may include a single upstream port for connection to a host device, and multiple downstream ports for connecting devices to the host device. In conventional USB hubs that implement reversible connections (e.g., via the USB TYPE-C specification), two USB 3.1 SuperSpeed TX/RX data links may be routed to the USB TYPE-C receptacle of the hub. Conventional hubs solve the problem of the two data SuperSpeed data links by using a 2:1 multiplexer to route to the appropriate one of the two data links to the receptacle.

Embodiments of the present disclosure eliminate the need for the 2:1 multiplexer used in conventional hubs, thereby reducing overall hub cost and area. The hub disclosed herein includes a controller that allows the number of serial interfaces provided by the hub to vary as needed. Accordingly, a four port hub controller can implement a hub having various combinations of USB TYPE-A and USB TYPE-C interfaces. Additional information on the operation of USB 3.1 and USB TYPE-C can be found in the Universal Serial Bus Revision 3.1 Specification provided by the USB Implementers Forum.

Figure 1:
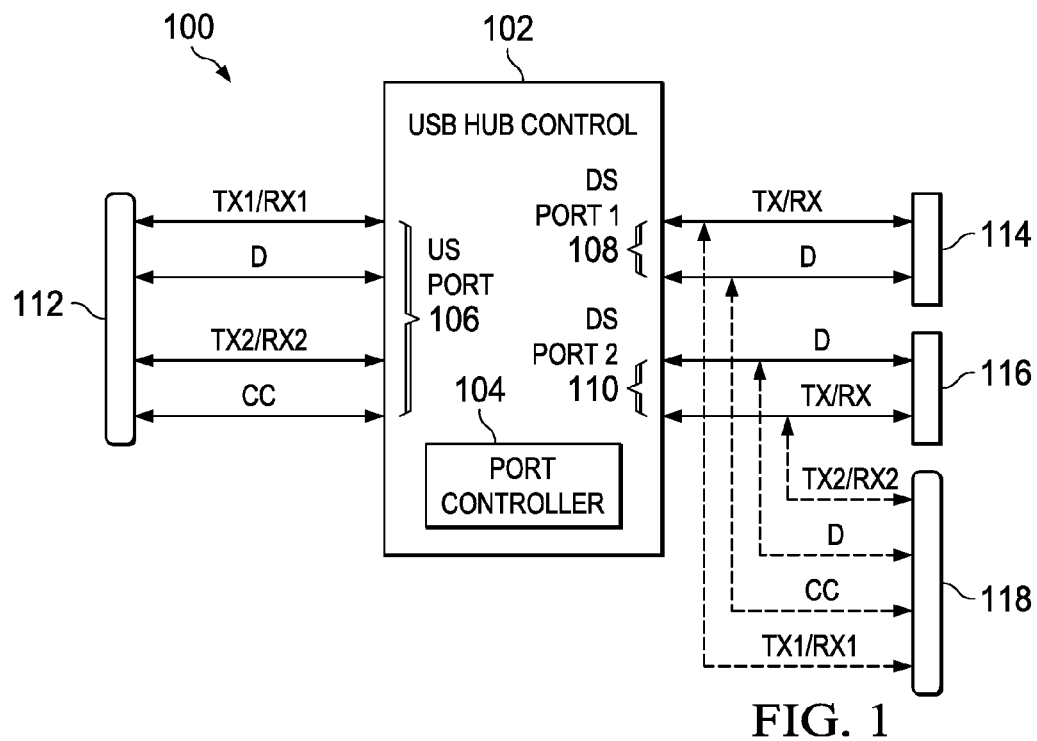
FIG. 1 shows a block diagram for a serial communication interface hub having configurable ports in accordance with various embodiments.

FIG. 1 shows a block diagram for a serial communication interface hub 100 having configurable ports in accordance with various embodiments. The hub 100 includes a hub controller 102. The hub controller 102 includes an upstream port 106, two downstream ports 108 and 110, and a port controller 104. The upstream port 106 is illustrated as implementing an upstream TYPE-C serial interface, but in some embodiments the upstream port 106 may implement an upstream TYPE-A serial interface.

While the hub controller 102 is illustrated as including two downstream ports 108, 110 as a matter of convenience and to simplify explanation, some embodiments may include 3, 4, or more ports. Each of the downstream ports 108, 110 includes a SuperSpeed TX/RX differential data link and D differential data link. The port controller 104 can configure the two downstream ports 108 and 110 to operate as two separate TYPE-A interfaces 114 and 116, or to operate as a single TYPE-C interface 118 as indicated by the dashed lines connecting the ports 108, 110 to the TYPE-C interface 118. Accordingly, in an embodiment of the hub 100 that includes more than the two downstream ports 108 and 110, the port controller 104 may implement various numbers of TYPE-A and/or TYPE-C interfaces.

The port controller 104 implements a TYPE-C interface without multiplexing the two ports 108, 110. To implement a TYPE-C interface in the hub 100, both ports 108 and 110 are dedicated to the TYPE-C interface, and the port controller 104 selects which of the ports 108, 110 provides the SuperSpeed data link based on the orientation of the cable connector in the hub receptacle. For example, if the cable's connector is installed in the hub receptacle in a first orientation, then the port controller 104 may enable port 108 to provide the SuperSpeed data link and provide the D data link to the TYPE-C interface. Similarly, if the cable's connector is installed in the hub receptacle in a second orientation, then the port controller 104 may enable port 110 to provide the SuperSpeed data link and provide the D data link to the TYPE-C interface. The port controller 104 can disable the one of the ports 108, 110 that is not selected to provide the SuperSpeed data link. Disabling the port may include switching power off to at least a portion of the unselected port to reduce hub power consumption.

The C-TYPE interface also includes a configuration channel (CC) that is used to detect cable attachment to the hub receptacle, detect the orientation of the cable connector in the hub receptacle, detect current mode, and determine other parameters of the C-TYPE serial interface. In the hub controller 102, the D data link signals may share pins with the CC signals. The port controller 104 may select whether D data link circuitry or CC circuitry in the port controller 104 is enabled. If the ports 108, 110 are used to implement TYPE-A serial interfaces, then the port controller 104 connects D link circuitry of each port to the corresponding serial interface. If the ports 108, 110 are used to implement a TYPE-C serial interface, then port controller 104 connects D link circuitry from a first of the ports 108, 110 to the TYPE-C serial interface and connects CC circuitry from a second of the ports 108, 110 to the TYPE-C serial interface. In this way the number of terminals of the hub controller 102 is minimized while allowing the hub controller to selectably provide both TYPE-A and TYPE-C serial interfaces.

Figure 2:
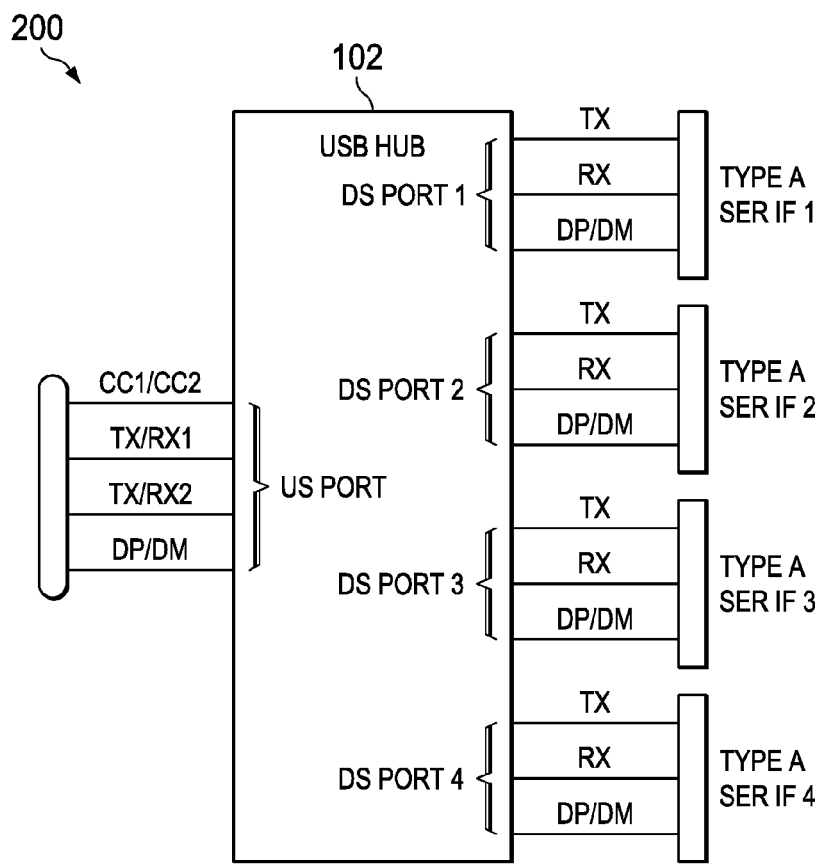
FIG. 2 shows a block diagram for a serial communication interface hub having configurable ports set to provide four Type-A interfaces in accordance with various embodiments.

FIGS. 2-6 show block diagrams using a four port embodiment of the hub controller 102 to implement various combinations of serial interfaces. In FIGS. 2-6, the hub controller 102 is illustrated as implementing an upstream TYPE-C serial interface, but in some embodiments the hub controller 102 may implement an upstream TYPE-A serial interface. In FIG. 2, the hub controller 102 applies the four downstream ports to implement four TYPE-A serial interfaces in the hub 200. The hub controller 102 enumerates the TYPE-A serial interfaces as 1-4 and reports the hub 200 as being a four port hub.

Figure 3:
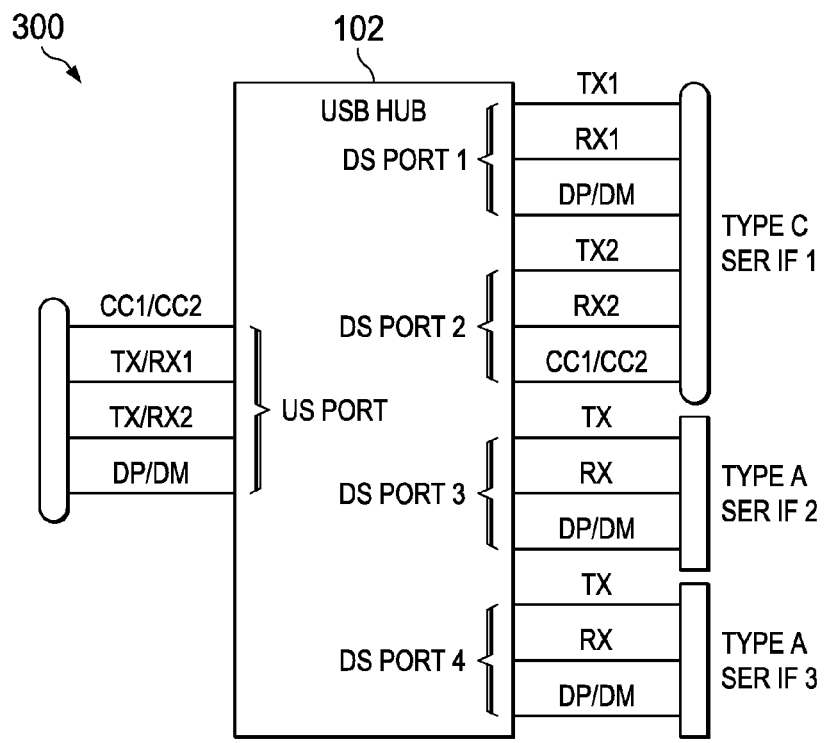
FIGS. 3-5 show block diagrams for a serial communication interface hub having configurable ports set to provide two Type-A interfaces and one Type-C interface in accordance with various embodiments.

In FIG. 3, the hub controller 102 applies downstream ports 1 and 2 to implement a TYPE-C serial interface, and applies downstream ports 3 and 4 to implement two TYPE-A serial interfaces. The hub controller 102 enumerates the TYPE-C serial interface as 1, and enumerates the TYPE-A serial interfaces as 2 and -3, and reports the hub 300 as being a three port hub.

Figure 4:
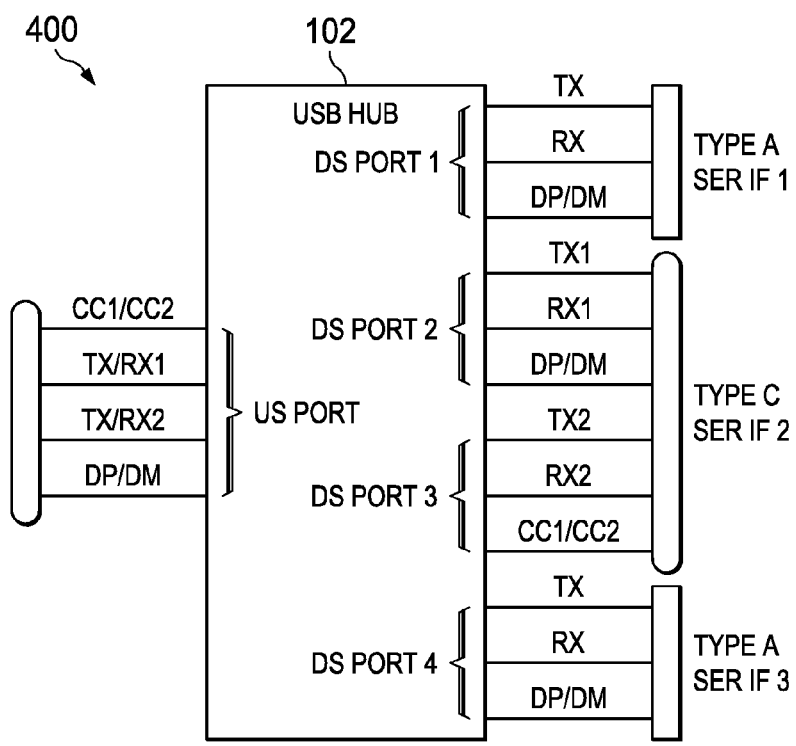

In FIG. 4, the hub controller 102 applies downstream ports 2 and 3 to implement a TYPE-C serial interface, and applies downstream ports 1 and 4 to implement two TYPE-A serial interfaces. The hub controller 102 enumerates the upper TYPE-A serial interface as 1, enumerates the TYPE-C serial interface as 2, enumerates the lower TYPE-A serial interface as 3, and reports the hub 400 as being a three port hub.

Figure 5:
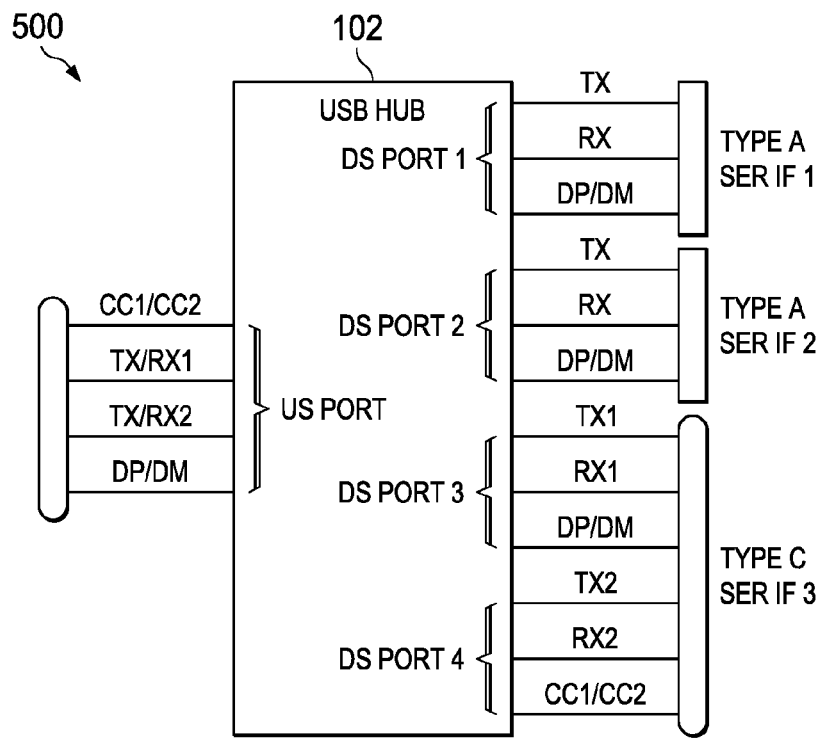

In FIG. 5, the hub controller 102 applies downstream ports 3 and 4 to implement a TYPE-C serial interface, and applies downstream ports 1 and 2 to implement two TYPE-A serial interfaces. The hub controller 102 enumerates the TYPE-A serial interfaces as 1 and 2, enumerates the TYPE-C serial interface as 3, and reports the hub 500 as being a three port hub.

Figure 6:
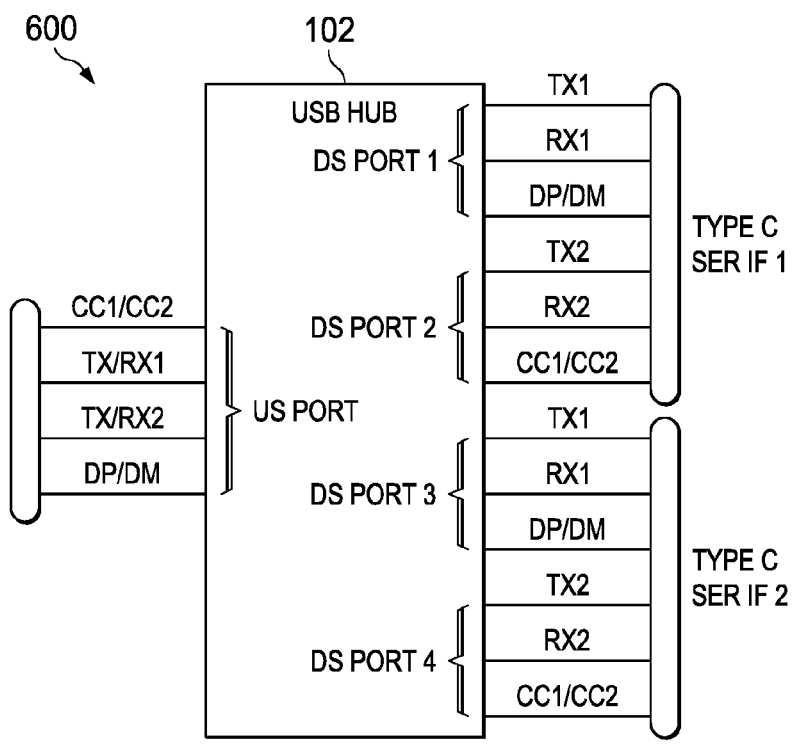
FIG. 6 shows a block diagram for a serial communication interface hub having configurable ports set to provide two Type-C interfaces in accordance with various embodiments.

In FIG. 6, the hub controller 102 applies downstream ports 1 and 2 to implement a first TYPE-C serial interface, and applies downstream ports 3 and 4 to implement a second TYPE-C serial interface. The hub controller 102 enumerates the TYPE-C serial interfaces as 1 and 2, and reports the hub 600 as being a two port hub.

While specific ports are illustrated in FIGS. 2-6 as being applied in combination to implement a TYPE-C serial interface, in various embodiments any two ports of the hub controller 102 may be applied in combination to implement a TYPE-C serial interface. For example, in some embodiments downstream ports 1 and 4 may be applied in combination to implement a TYPE-C serial interface.

Figure 7:
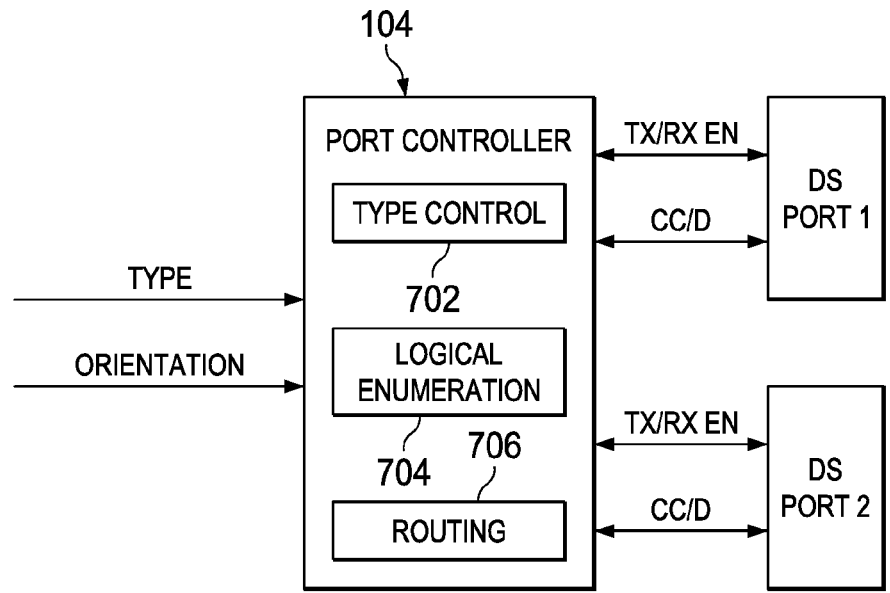
FIG. 7 shows a block diagram for a port controller suitable for use in a serial communication interface hub having configurable ports in accordance with various embodiments.

FIG. 7 shows a block diagram for a port controller 104 suitable for use in a serial communication interface hub having configurable ports in accordance with various embodiments. The port controller 104 includes type control circuitry 702, logical enumeration circuitry 704, and routing circuitry 706.

The type control circuitry 702 controls the ports 108 and 110 of the hub 100 to implement a TYPE-A serial interface or a TYPE-C serial interface. A type control signal (TYPE) is provided to the type control circuitry 702 as a configuration flag that specifies the type of serial interface to be implemented using each downstream port of the hub controller 102. For example, a first state of the TYPE signal may indicate that a port 108, 110 is to implement a TYPE-A serial interface, and a second state of the TYPE signal may indicate that a port 108, 110 is to implement a TYPE-C serial interface. Referring now to FIG. 3, TYPE signals in the hub controller 102 may indicate that downstream ports 1 and 2 of the hub controller 102 are to be applied in combination to implement a TYPE-C serial interface, and that each of ports 3 and 4 are to implement a TYPE-A serial interface. The TYPE signals may be generated by programmable elements in the hub controller 102, such as memory cells or fusible links that are programmed to produce a desired state of the TYPE signal for each port of the hub controller 102.

An ORIENTATION signal provided to the type control circuitry 702 specifies the orientation of the TYPE-C cable connector in the hub TYPE-C receptacle. Based on the orientation signal, the type control circuitry 702 determines which of the ports 108, 110 used in the TYPE-C serial interface is enabled and which is disabled. If the port is enabled, then the port provides the SuperSpeed data link and the D data link to the TYPE-C serial interface. If the port is not enabled, then at least part of the port may powered off to reduce the energy consumption of the hub. The ORIENTATION signal may be derived from the CC signals provided by connection of the C-TYPE cable to the C-TYPE receptacle of the hub in accordance with USB 3.1 Specification.

The type control circuitry 702 may route CC signals to the TYPE-C serial interface using pins associated with the D data link of the disabled port. Accordingly, the type control circuitry 702 may enable or disable D data link and CC circuitry in the hub controller 102 to provide the C-TYPE serial interface. In various embodiments, the D data link and/or the CC signals may be provided from either of the ports used to implement a C-TYPE serial interface.

The logical enumeration circuitry 704 assigns identification values to each of the serial interfaces implemented by a hub controller 102. For example, a four port hub may implement 4 TYPE-A serial interfaces, 1 TYPE-C serial interface and 2 TYPE-A serial interfaces, or 2 TYPE-C serial interfaces. In each case the total number of serial interfaces implemented, rather than the total number of ports employed to implement the serial interfaces, is reported to a host device. That is, a hub controller 102 that implements 3 serial interfaces using 4 ports will report itself as being a 3 port device rather than a 4 port device, and the three serial interfaces (i.e., the three logical ports) will be enumerated 1-3. Referring to FIG. 3, the TYPE-C serial interface is assigned an identification value of 1, the middle TYPE-A serial interface is assigned an identification value of 2, and the lower TYPE-A serial interface is assigned an identification value of 3. That is, the TYPE-C serial interface is identified as logical port 1, the middle TYPE-A serial interface is identified as logical port 2, and the lower TYPE-A serial interface is identified as logical port 3. Table 1 below shows logical port numbering (i.e., serial interface enumeration) for a hub that includes 4 physical ports that are configurable to implement five possible combinations of A-TYPE and C-TYPE serial interfaces.

TABLE 1

| Physical port | Connector Type/Logical port | | | | |
|---|---|---|---|---|---|
| 1 | A/1 | C/1 | A/1 | A/1 | C/1 |
| 2 | A/2 | C/1 | C/2 | A/2 | C/1 |
| 3 | A/3 | A/2 | C/2 | C/3 | C/2 |
| 4 | A/4 | A/3 | A/3 | C/3 | C/2 |

The routing circuitry 706 steers data between the upstream port 106 and the downstream ports 108, 110. If the hub 100 is configured to implement two TYPE-A serial interfaces (identified as 1 and 2), then the routing circuitry 706 steers data received at the upstream port 106 and directed to port 1 to downstream port 1. Similarly, if the hub 100 is configured to implement two TYPE-A serial interfaces (identified as 1 and 2), then the routing circuitry 706 steers data received at the upstream port 106 and directed to port 2 to downstream port 2.

If the hub 100 is configured to implement a TYPE-C serial interface (identified as 1), then the routing circuitry 706 steers data received at the upstream port 106 and directed to port 1 to one of the downstream ports 1 and 2. Which of the downstream ports 1 and 2 is selected to receive the data may be based on the state of the ORIENTATION signal. For example, if the ORIENTATION signal is set to a first state, then the routing circuitry 706 may steer data received at the upstream port 106 and directed to port 1 to downstream port 1. If the ORIENTATION signal is set to a second state, then the routing circuitry 706 may steer data received at the upstream port 106 and directed to port 1 to downstream port 2. More generally, data received at the upstream port 106 and directed to port 1 will be steered to whichever of the downstream ports 108, 110 is enabled to provide the SuperSpeed data link to the TYPE-C serial interface.

Figure 8:
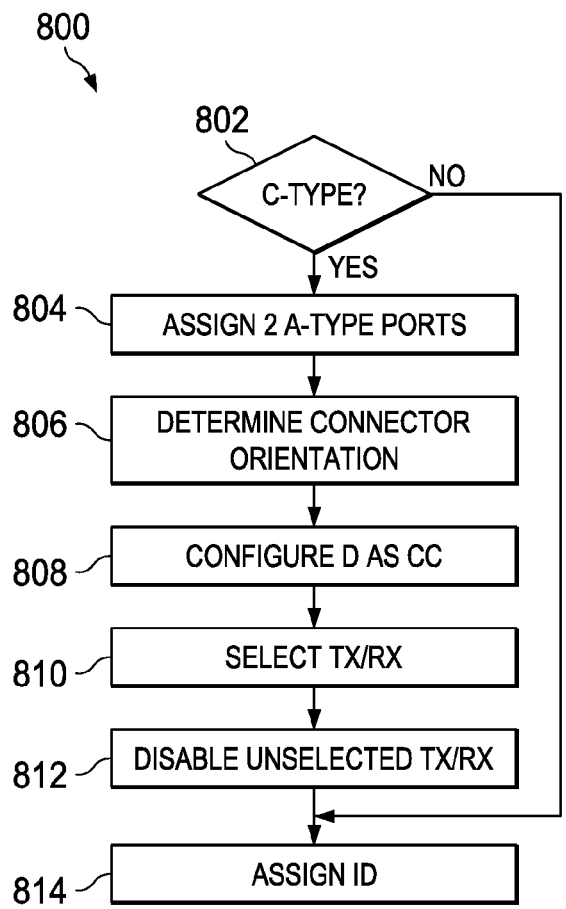
FIG. 8 shows a flow diagram for a method for controlling the ports in a serial communication interface hub having configurable ports in accordance with various embodiments.

FIG. 8 shows a flow diagram for a method for controlling the ports in a serial communication interface hub having configurable ports in accordance with various embodiments. Though depicted sequentially as a matter of convenience, at least some of the actions shown can be performed in a different order and/or performed in parallel. Additionally, some embodiments may perform only some of the actions shown.

In block 802, the port controller 104 determines whether a port of the hub is to be used to implement a TYPE-C serial interface or a TYPE-A serial interface. The determination may be based on the state of the TYPE signal corresponding to the port. If the port is to be used to implement a TYPE-A serial interface, then the port is enabled, a count of the implemented serial interfaces is incremented, and a sequential identification value is assigned to the TYPE-A serial interface. For example, the value of the count of the implemented serial interfaces may be assigned to the TYPE-A serial interface as the identification value.

If the port is to be used, in combination with another port, to implement a TYPE-C serial interface, then in block 804, the port controller 104 assigns two ports of the hub controller to the TYPE-C serial interface. Each of the ports assigned to the TYPE-C serial interface may be capable of implementing a TYPE-A serial interface. The port controller 104 may configure one of the two ports assigned to the C-TYPE serial interface to provide CC signals to the hub receptacle for the C-TYPE serial interface.

In block 806, a cable connector engages the hub receptacle of the TYPE-C serial interface. Responsive to the cable engagement, the port controller 104 determines the orientation of the cable connector based on the CC signals received from the hub receptacle.

In block 808, based on the orientation of the cable connector, the port controller 104 selects one of the two ports assigned to the TYPE-C serial interface to provide the SuperSpeed data link and the D data link to the TYPE-C serial interface. The D data link terminals of the other of the two ports assigned to the TYPE-C serial interface may be configured to provide the CC signals to the TYPE-C serial interface.

In block 810, the SuperSpeed data link of one of the two ports (i.e., the port not providing the SuperSpeed data link) assigned to the TYPE-C serial interface may be disabled. Power may be disabled to at least a portion of the port to reduce energy consumption.

In block 812, a count of the implemented serial interfaces is incremented, and a sequential identification value is assigned to the TYPE-C serial interface. For example, the value of the count of the implemented serial interfaces may be assigned to the TYPE-C serial interface as the identification value.

Pseudo-code representative of the operations of the port controller 104 for enumerating serial interfaces (i.e., logical ports), and mapping physical ports to the serial interfaces is provided below:

```
initial {
  logical_count = 0
  physical_port = 1
  while physical_port <= physical_N
  {
    logical_count = logical_count + 1
    physical_to_logical[physical_port] = logical_count
    logical_to_physical[logical_count] = physical_port
    type_c_logical[logical_count] = type_c_pair[physical_port]
    physical_port = physical_port + 1
    if (type_c_logical[logical_count]) {
        physical_to_logical[physical_port] = logical_count
          physical_port = physical_port + 1
    }
  }
  logical_N = logical_count //max number of logical ports
}
//for any port request to map the logical to physical port number
map_log_to_phys (logical_port_number)
{
  physical_port_number = logical_to_physical[logical_port_number]
  if (type_c_logical[logical_port_number] &&
  type_c_orientation[physical_port_number]) {
      physical_port_number = physical_port_number + 1
  }
}
```

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A serial communication hub, comprising:
an upstream port;
a plurality of downstream ports; and
a port controller configured to:
arrange a first port of the plurality of downstream ports and a second port of the plurality of downstream ports to operate in combination as a serial communication interface,
determine an orientation of a cable connector coupled to the serial communication interface, and
based on the determined orientation, enable one of the first port and the second port, and disable the other port.

2. The serial communication hub of claim 1, wherein the port controller is further configured to allocate first serial transmit and receive links from each of the first port of the plurality of downstream ports and the second port of the plurality of downstream ports to the serial communication interface.

3. The serial communication hub of claim 2, wherein the port controller is further configured to arrange each of the first port and the second port to individually operate as a first type of serial communication interface, and wherein the serial communication interface where the first port and the second port operate in combination is a second type of serial communication interface.

4. The serial communication hub of claim 3, wherein the port controller is further configured to identify the second type of serial communication interface by a same identification value without regard to whether the first serial transmit and receive links of the first port or the second port of the plurality of downstream ports are enabled.

5. The serial communication hub of claim 3, wherein the port controller is further configured to determine a total number of downstream serial communication interfaces provided by the hub as a total number of downstream ports less a total number of the second type of serial communication interface.

6. The serial communication hub of claim 3, wherein the port controller is further configured to assign an identification value to each of the first and second type of serial communication interfaces based on a total number of the first and second type of serial communication interfaces implemented.

7. The serial communication hub of claim 3, wherein the port controller is further configured to:
selectively program given signal lines of the first port of the plurality of downstream ports and the second port of the plurality of downstream ports to operate as second serial transmit and receive links based on the first port of the plurality of downstream ports and the second port of the plurality of downstream ports being arranged to individually operate as the first type of serial communication interface; and
selectively program the given signal lines of the first port of the plurality of downstream ports or the second port of the plurality of downstream ports to operate as a configuration channel based on the first port of the plurality of downstream ports and the second port of the plurality of downstream ports being arranged to operate as the second type of serial communication interface.

8. A method for configuration of a serial communication hub, comprising:
based on a configuration flag having a value, arranging a first downstream port and a second downstream port to operate in combination as a serial communication interface;
determining an orientation of a cable connector coupled to the second type of serial communication interface; and
based on the determined orientation, enabling one of the first downstream port and the second downstream port, and disabling the other downstream port.

9. The method of claim 8, further comprising:
allocating first serial transmit and receive links from each of the first downstream port and the second downstream port to the serial communication interface.

10. The method of claim 9 further comprising:
based on the configuration flag having a first value, arranging each of the first downstream port and the second downstream port to individually operate as a first type of serial communication interface, wherein the serial communication interface where the first port and the second port operate in combination is a second type of serial communication interface in response to the configuration flag having a second value.

11. The method of claim 10, further comprising:
identifying the second type of serial communication interface by a same identification value without regard to whether the first serial transmit and receive links of the first or second of the downstream ports is enabled.

12. The method of claim 10 further comprising:
assigning an identification value to each of the first and second type of serial communication interfaces based on a total number of the first and second type of serial communication interfaces.

13. The method of claim 10 further comprising:
selectively programming given signal lines of the first downstream port and the second downstream port to operate as second serial transmit and receive links based on the first downstream port and the second downstream port being arranged to individually operate as the first type of serial communication interface; and
selectively programming the given signal lines of the first downstream port or the second downstream port to operate as a configuration channel based on the first downstream port and the second downstream port being arranged to operate as the second type of serial communication interface.

14. The method of claim 8 further comprising:
determining a total number of downstream serial communication interfaces provided by the hub as a total number of downstream ports less a total number of the second type of serial communication interface.

15. A serial bus expander, comprising:
a plurality of ports, each of the ports configured to implement a first type of serial communication interface that comprises an irreversible electrical connector; and wherein each of the ports comprises:
first serial transmit and receive links; and
second serial transmit and receive links; and
a port controller configured to:
  selectably arrange two of the ports to operate in combination to implement a second type of serial communication interface that comprises a reversible electrical connector;
  apply the first serial transmit and receive links of only one of the ports in the second type of serial communication interface; and
  identify the second type of serial communication interface by a same identification value without regard to which of the two ports provides the first serial transmit and receive links used in the second type of serial communication interface.

16. The serial bus expander of claim 15, wherein the port controller is configured to:
determine an orientation of reversible electrical connector; and
enable the first serial transmit and receive links of a first of the two ports for use in the second type of serial communication interface based on the orientation; and
disable the first serial transmit and receive links of a second of the two ports for use in the second type of serial communication interface based on the orientation.

17. The serial bus expander of claim 15, wherein the port controller is configured to determine a total number of serial communication interfaces provided by the hub as a total number of the ports less a total number of the second type of serial communication interfaces implemented by the port controller.

18. The serial bus expander of claim 15, wherein the port controller is configured to assign an identification value to each of the first and second type of serial communication interfaces based on a total number of the first and second type of serial communication interfaces implemented by the port controller.

19. The serial bus expander of claim 15, wherein the port controller is configured to, as part of selective arrangement of two of the ports to operate in combination to implement the second type of serial communication interface:
selectively program given signal lines of a first of the two ports to operate as the second serial transmit and receive links in the second type of serial communication interfaces; and
selectively program the given signal lines of a second of the two ports to operate as a configuration channel of the second type of serial communication interface.

20. The serial bus expander of claim 15, wherein the first type of serial communication interface and second type of serial communication interface are implementations of a universal serial bus.

* * * * *